United States Patent [19]

Rapson et al.

[11] 4,111,276

[45] Sep. 5, 1978

[54] SKIRTS FOR GAS CUSHION VEHICLES

[75] Inventors: John Edward Rapson, Southampton; Dean Alders, Lyndhurst, both of England

[73] Assignee: Hovercraft Development Limited, London, England

[21] Appl. No.: 780,104

[22] Filed: Mar. 22, 1977

[30] Foreign Application Priority Data

Mar. 26, 1976 [GB] United Kingdom ............... 12257/76

[51] Int. Cl.² ............................................. B60V 1/00
[52] U.S. Cl. ..................................... 180/117; 180/128
[58] Field of Search ............... 180/116, 117, 118, 120, 180/121, 124, 127, 128

[56] References Cited

U.S. PATENT DOCUMENTS

| 3,481,423 | 12/1969 | Winter | 180/117 |
| 3,532,179 | 10/1970 | McCreary | 180/117 |
| 3,621,931 | 11/1971 | Hunt | 180/117 |
| 3,891,047 | 6/1975 | Rapson | 180/117 |

FOREIGN PATENT DOCUMENTS 781,806   4/1968   Canada ................................. 180/128

*Primary Examiner*—Joseph F. Peters, Jr.
*Assistant Examiner*—Terrance L. Siemens
*Attorney, Agent, or Firm*—Cameron, Kerkam, Sutton, Stowell & Stowell

[57] ABSTRACT

In a two-stage hovercraft skirt comprising an upper loop from which segments depend, operational movements of the skirt are effected by an adjusting tie extending at right angles and connected to generally radially directed ties by which the segments are secured to the hovercraft. By connecting the adjusting tie to the midpoint of the segment ties, holding the skirt against sympathetic movement with the adjusting tie and operating the latter by a lever system mechanically equivalent to the tie system the force required to cause movement of the skirt may be kept constant. Movements of the skirt may be used to cause or control rolling, pitching or heaving of the hovercraft.

8 Claims, 17 Drawing Figures

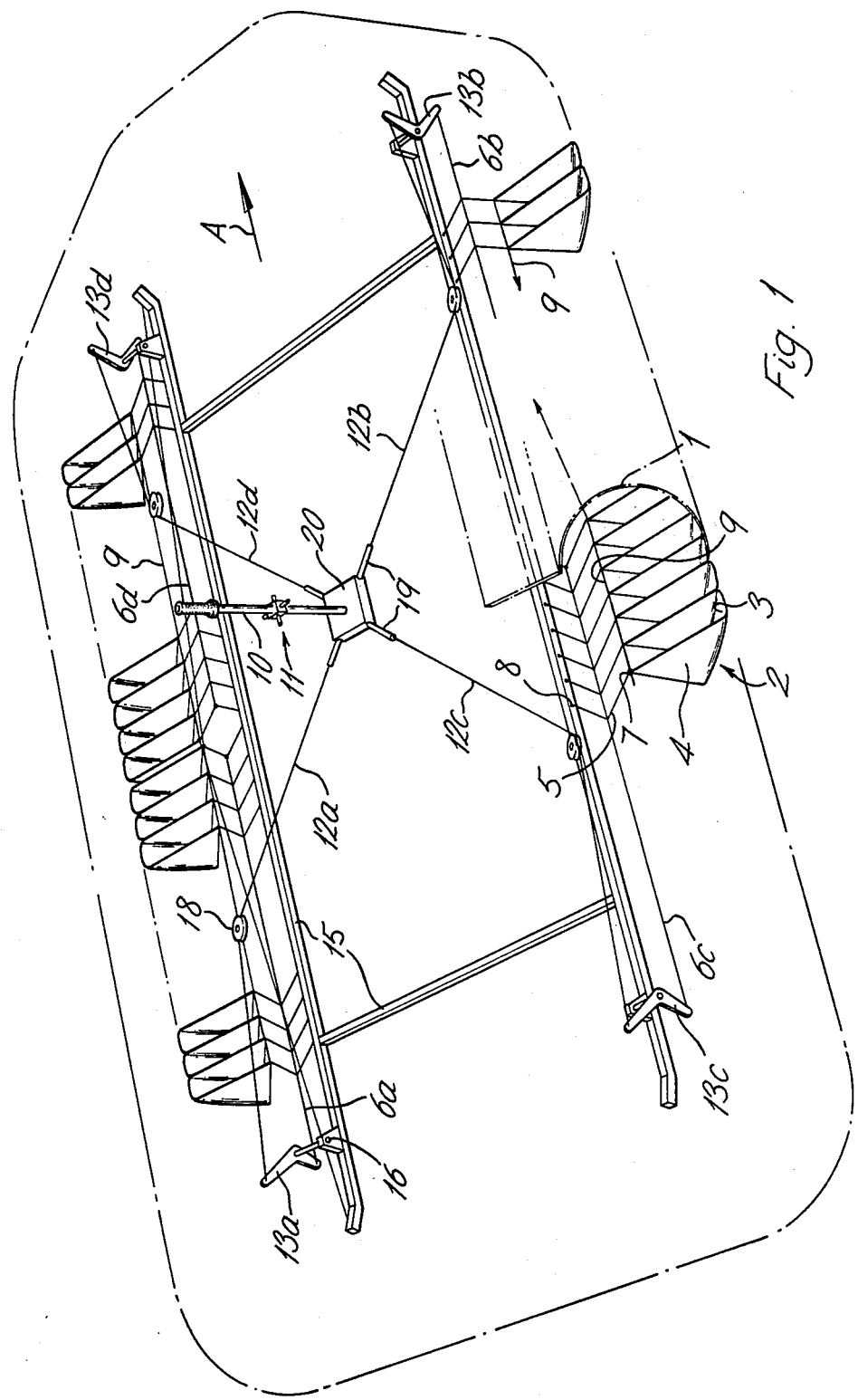

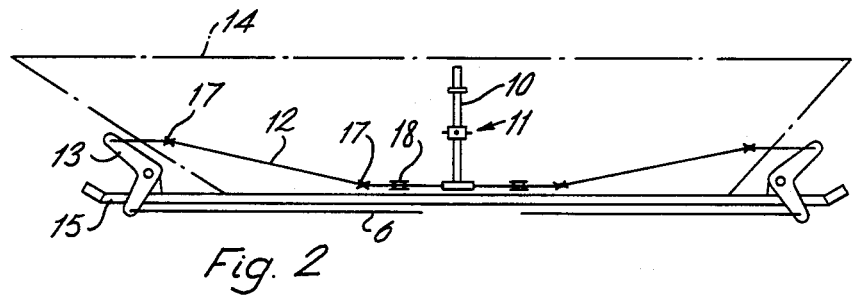
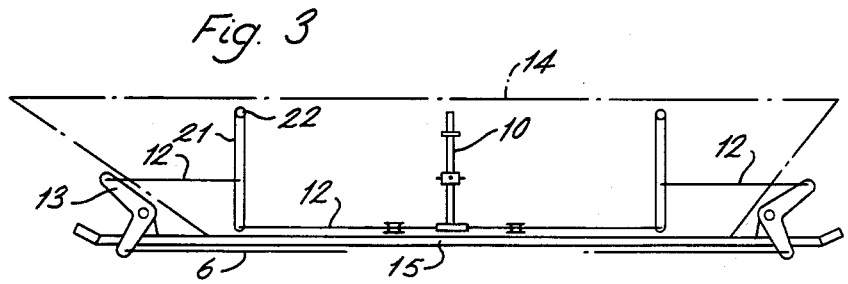
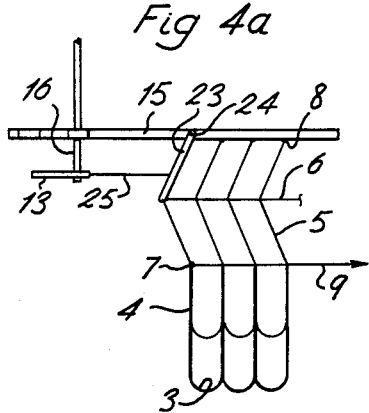
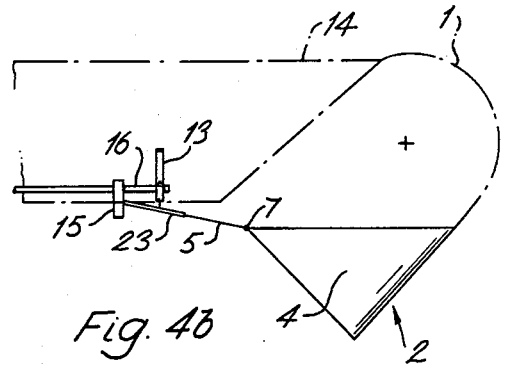

4,111,276

SKIRTS FOR GAS CUSHION VEHICLES

This invention relates to modifications of or improvements in cushion containing skirts of gas cushion vehicles the subject of U.S. Pat. No. 3,891,047 in which there is described and claimed a skirt for a gas cushion vehicle comprising upper and lower parts of flexible sheet material, the upper part being connected to the vehicle body so as to be deflectable relative thereto, at least the lower part comprising a contiguous succession of independently deflectable flexible wall members each having an outer portion which faces the gas cushion and a pair of inwardly extending side portions, the side portions being connected to the vehicle body by tie means, in which adjusting means are provided to cause angular movement of at least inner portions of the tie means about substantially vertical axes passing through their attachments to the vehicle and thereby result in the outer portions of the wall members being moved laterally in a direction towards or away from the vehicle body.

In a preferred embodiment the adjusting means comprise further tie means extending substantially at right angles to the side portions of the wall members and operatively connected to the tie means thereof, and means are provided operative to effect linear movement of the further tie means to cause the said movement of the wall members.

It will be understood that by providing for such adjusting movement of such skirts a shift in the position of the centre of pressure of the gas cushion in relation to the centre of gravity of a vehicle may be occasioned, or fluctuations in cushion pressure may be alleviated. By appropriately shifting the centre of pressure of the cushion in relation to the centre of gravity of a vehicle, roll or pitch of the vehicle may be combatted or promoted or general adjustment of the trim of the vehicle may be effected.

It is the object of the present invention to provide an improved mechanism for effecting and controlling movement of the wall members comprising such a skirt.

In accordance with the present invention in a gas cushion vehicle having a skirt comprising upper and lower parts of flexible sheet material, the upper part being connected to the vehicle body so as to be deflectable relative thereto, at least the lower part comprising a contiguous succession of independently deflectable flexible wall members each having an outer portion which faces the gas cushion and a pair of inwardly extending side portions, the side portions being connected to the vehicle body by tie means, there is provided a skirt control mechanism comprising adjusting tie means extending substantially at right angles of the said tie means and operatively connected to substantially the mid point thereof, means including a lever system operative to effect linear movement of the adjusting tie means and means to at least restrict movement of the wall members in a direction parallel to the adjusting tie means upon adjusting movement thereof, whereby upon linear movement of the adjusting tie means the said tie means connected to the side portions of the wall members are caused to be angled and thereby result in the outer portions of the wall members being moved in a direction towards or away from the vehicle body, the lever system being mechanically equivalent to the lever system effectively constituted by the said tie means and the said adjusting tie means and arranged to act such that as the mechanical advantage of one lever system alters an equal and opposite alteration occurs in the other lever system so that for a given cushion pressure the force required to operate the adjusting tie means is maintained substantially constant at least over a predetermined range of movement.

The invention is described below with reference to the accompanying drawings in which:

FIG. 1 is a diagrammatic perspective view of a gas cushion vehicle showing one embodiment of the skirt control mechanism;

FIG. 2 is a diagrammatic side elevation of the mechanism of FIG. 1;

FIG. 3 is a diagrammatic side elevation of a modified form of control mechanism;

FIGS. 4a and 4b are fragmentary diagrammatic plan and end elevational views respectively of a further modification of the control mechanism;

Figure 8:
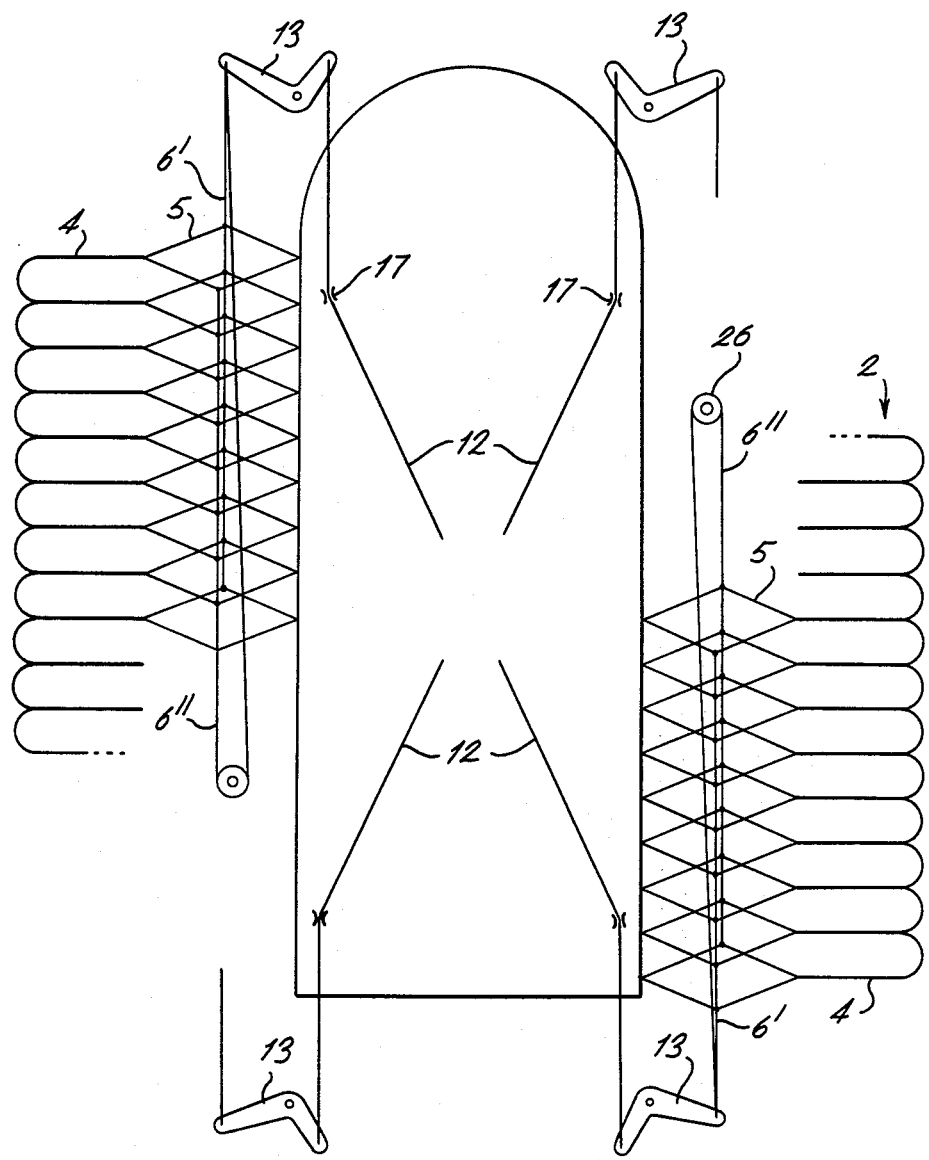
FIG. 8 is a diagrammatic plan view showing an alternative arrangement of skirt ties.
Figure 9:
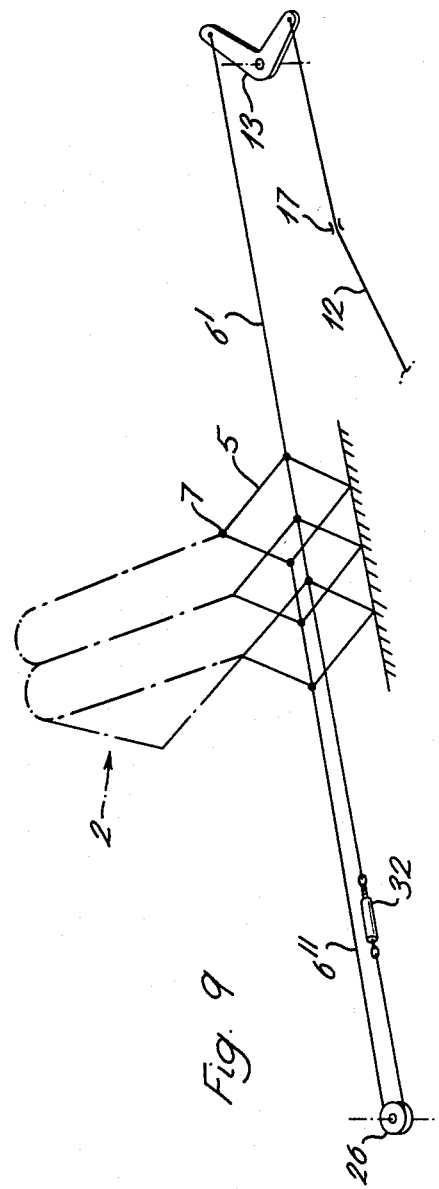
FIG. 9 is a fragmentary perspective view of a modification of FIG. 8.
Figure 11A:
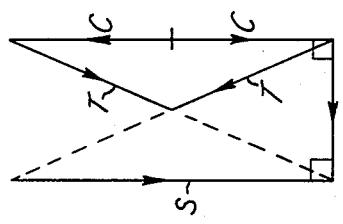
Figure 11B:
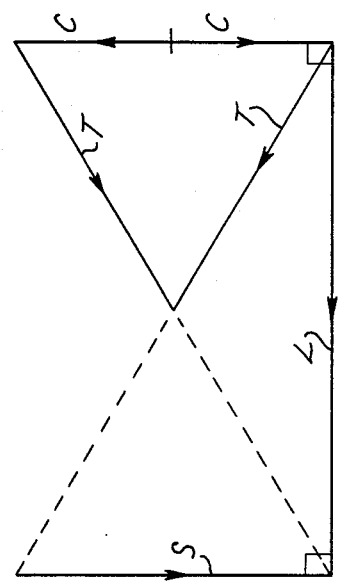
Figure 10A:
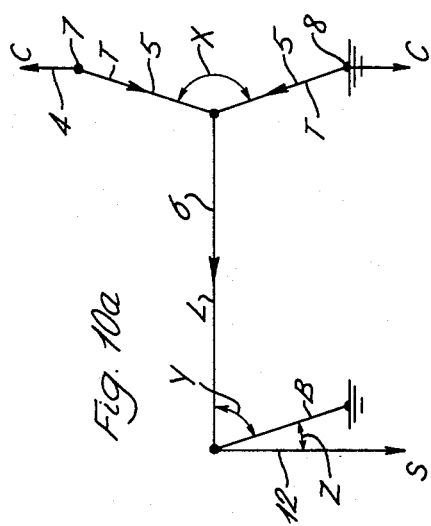
Figure 10B:
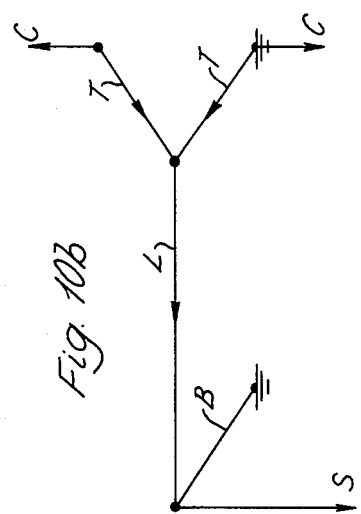

FIGS. 10a and 10b are idealised diagrammatic representations of the lever systems exemplified in the embodiments of FIGS. 1 to 9, and FIGS. 11a and 11b are vector diagrams of the forces involved in the lever system when in the positions indicated in FIGS. 10a and 10b respectively.

In accordance with the invention and in all the arrangements illustrated a gas cushion vehicle is equipped with skirts, as best seen in FIGS. 1 and 4, comprising upper and lower parts formed of flexible sheet material, the upper part comprising a simple sheet forming a loop 1 which is attached at its upper edge to the vehicle body and at its lower edge to the lower part of the skirt. This lower part comprises a succession of independently deflectable flexible wall members 2 of the kind described in U.S. Pat. No. 3420330, each wall member comprising an outer portion 3 and a pair of side portions 4 secured by ties 5 to the body of the gas cushion vehicle. Movement of the outer portions of the wall members towards and away from the vehicle body is effected by linear movement of adjusting ties 6 which are secured in the ties 5 intermediate the connections of the latter to the side portions of their associated wall members at 7, and their anchorages to the vehicle body at 8. Longitudinal movement of wall members is at least restricted if not prevented by longitudinally extending restraining ties 9.

In practice to provide for both roll and pitch control it is envisaged that a gas cushion vehicle will be provided with at least four sections of skirt, two on each side of the vehicle, the fore section of skirt on one side being operatively connected with the aft section of skirt on the other side, the arrangement being such that as one of an interconnected pair of skirt sections is moved inwardly the other section moves outwardly, or vice versa.

Referring now to FIGS. 1 and 2, operation and control of movement of the skirt of a gas cushion vehicle in which the skirt is divided into four sections as mentioned above, is effected by a control column 10 supported intermediate its ends by a universal joint 11 and to one end of which are connected cables 12a, b, c and d each of which is secured at its other end to one arm of an associated bellcrank lever 13a, b, c and d. The adjusting ties 6a, b, c and d associated with the four aforementioned skirt sections are connected to the other arm of a respective one of the bellcrank levers. In the arrangement illustrated the body 14 of the gas cushion vehicle has a frame 15 to which the bellcranks 13 are secured by horizontal pivots 16. The cables 12 are conveniently passed through bushes 17 and pulleys 18 as shown, and are connected to the control column 10 through the intermediary of turnbuckles 19 which in turn are conveniently secured to a plate 20 universally pivoted to the lower end of the control column.

In the modification shown in FIG. 3 each control cable 12 is formed in two parts interconnected by a lever 21 which in this case is pivoted at its upper end 22 to the vehicle structure. This arrangement avoids wear associated with the use of bushes and should reduce friction and can provide the system with added mechanical advantage. Additionally the arrangement helps to keep the control wires parallel which is desirable for the efficient operation and balance of the system in operation as will be described hereinafter.

The bellcranks 13, being external the body of the vehicle and one of their arms projecting as it will, depending upon its operating position, below the frame 15, may be prone to damage through accidental contact with obstacles traversed by the vehicle. The length of the lower arm of the bellcranks may be relatively shortened to reduce risk of such damage if a lever 23 as illustrated in FIGS. 4a and 4b is employed which is pivoted at its inner end 24 to the vehicle frame 15, in the plane of the ties 5, and to the outer end of which the adjusting tie 6 of the associated skirt section is secured. The lever 23 is then in turn connected by a cable 25 acting intermediate its ends, to the lower arm of the bellcrank lever. The lever 23 is arranged so as to extend parallel to and to be of the same length as the portions of the ties 5 inboard of the adjusting tie 6 so as to be operationally equivalent to the lower arms of the bellcranks in the preceding embodiments, as will be further explained below.

Figures 5A, 5B:
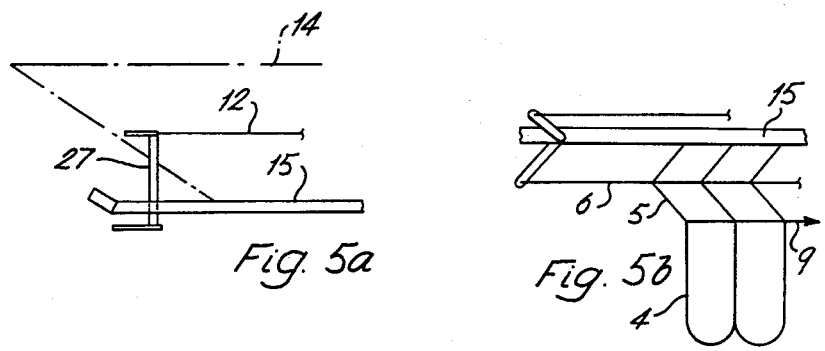
FIGS. 5a and 5b are fragmentary side elevation and plan views respectively of yet a further modification of the control mechanism.

Clearly, instead of, as in the preceding embodiments, having bellcranks mounted on horizontal axes, cranks acting about substantially vertical axes may be employed. Such cranks may conveniently as indicated in FIGS. 5a and 5b be formed with a shaft 27 journalled in a sleeve (not shown) passing through the body of the vehicle, the shaft and sleeve being of such a length that the upper end of the sleeve is above the level of the water line when the vehicle floats on water.

Figure 6A:
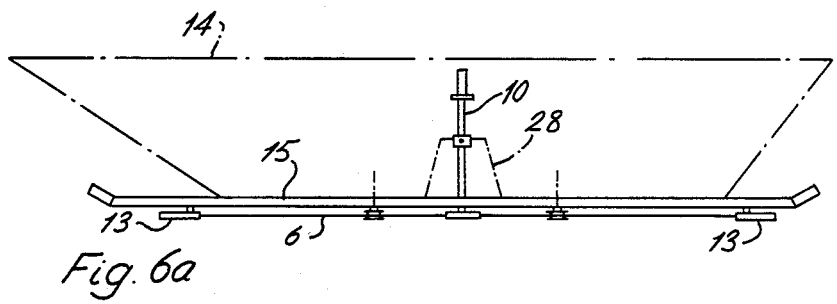
FIGS. 6a and 6b are a diagrammatic side elevation and plan view respectively of yet a further modification of the control mechanism.
Figure 6B:
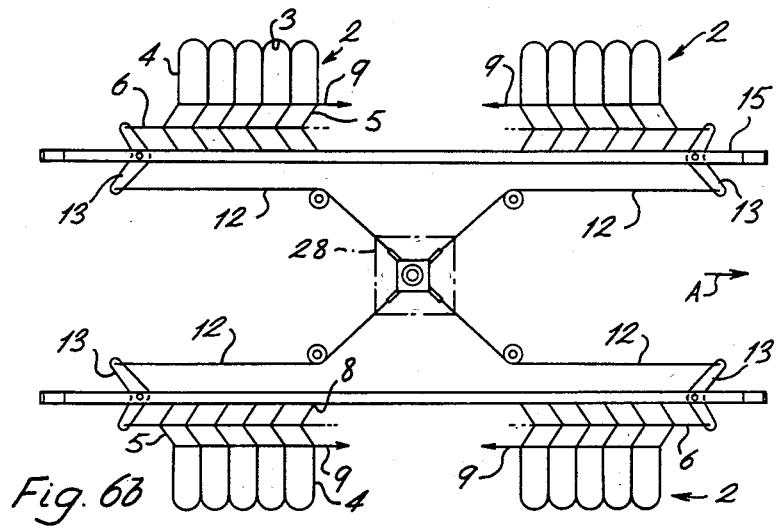

A still further alternative arrangement is shown in FIG. 6a and 6b in which the bellcranks and control cables are all positioned beneath the frame of the vehicle. With such an arrangement a false bottom may be provided for the craft to protect the control cables, pulleys etc. so far as possible. The lower end of the control column would need to be contained within an air and water-tight housing as indicated at 28.

Figure 7:
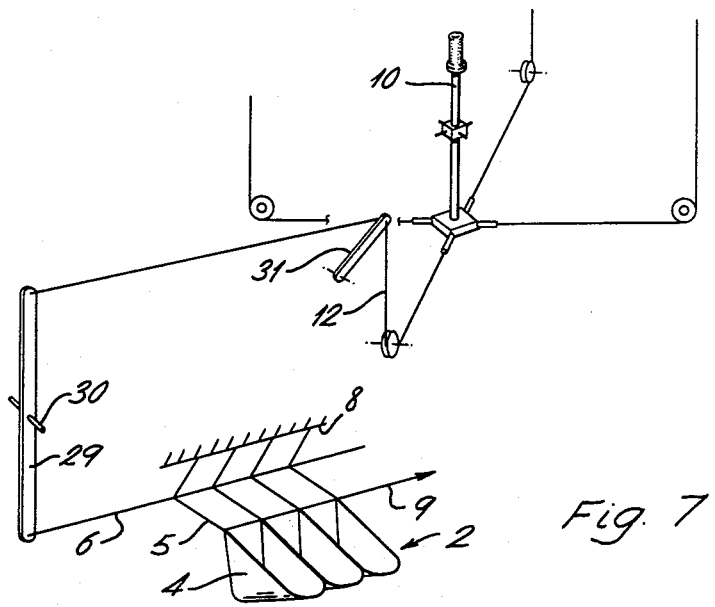
FIG. 7 is a diagrammatic perspective view of a still further modification of the control mechanism.

Although it is convenient, it is by no means essential to employ two-armed or bellcrank levers. Thus a one-armed lever as illustrated at 31 in FIG. 7 may be used which is operationally equivalent to the lever 23 of FIG. 4 and the lower arm of the bellcranks in other embodiments. FIG. 7 also demonstrates the fact that the lever 31 or its equivalent may be disposed at any convenient point in a lever system, in this case the adjusting ties 6 of the skirt sections each being connected to the lever 31 via a lever 29 pivoted at its centre 30 to the vehicle structure, so that the lever 31 may be located adjacent the control column or wherever else desired.

Although in all the arrangements illustrated in FIGS. 1 to 7 the adjusting ties 6 lead towards the ends of the craft, the system of ties or part of the system may in fact be reversed so that the adjusting ties converge towards the centre of the craft or the location of the control column. In this event the arrangement of the restraining ties 9, which as previously mentioned at least restrict if they do not prevent longitudinal movement of the wall members 2 in sympathy with their associated adjusting ties 6, will be reversed. That is to say instead of, as in the arrangements illustrated, being anchored to for example the frame 15 at the opposite end of the vehicle to that of the skirt sections to the side portions of the wall members of which the tie is otherwise coupled at or adjacent the points 7, the ties 9 will be led from those points to the same end of the vehicle as that at which its associated skirt section is situated. Such a reversed arrangement of the ties 9 may require the provision of special anchorages disposed outboard of the anchorages 8 of the ties 5 to the vehicle body, so that the ties 9 may extend parallel or as near parallel as practical to the line of anchorages 8. Although certain of the illustrations may give a distorted appearance to the contrary, in practice with the arrangements shown the relative distances between one skirt section and the opposite end of the vehicle will be such that the divergence of the ties 9 over their length coupled to the side portions of the wall members, from a direction substantially parallel with the adjacent side of the vehicle body, is insignificant.

An alternative arrangement of ties which avoids the need for restraining ties 9 as such, is shown in FIGS. 8 and 9. Thus the ties 5 are duplicated to adopt a diamond formation in operation, one tie 5 of a pair connected to a given one of the side portions of the wall members being operable by a first adjusting tie 6', and the other tie 5 of the pair being operable by a second adjusting tie 6", the latter being passed round a pulley 26 so as to be operable in unison with the tie 6' with which it shares a common connection point to the lever 13. In FIG. 9 a simplification is shown in which the ties 6' and 6" are different runs of the same cable. As shown a turnbuckle 32 is conveniently provided to allow for such adjustment as may be necessary to ensure symmetry in the tie system.

The basic operation of the skirt sections, i.e. the manner in which movement of the wall members making up the skirt sections is effected, is the same as described in the parent specification. For practical purposes the normal operating or datum position of the skirt sections in arranged to be one in which the adjusting ties 6 hold the ties 5 of the wall members in an angled, chevron or diamond formation as illustrated. Appropriate movement of the adjusting ties may then either allow the wall members to move away from the adjacent structure of the vehicle to which they are secured, under the influence of cushion pressure, or alternatively to be moved towards the vehicle structure against the forces exerted thereon by cushion pressure.

The manner in which, in accordance with the invention the alternative lever systems described operate to maintain the force required to effect controlled movements of the skirt or skirt section, substantially constant, may best be understood by reference to the diagrams of FIGS. 10 and 11.

The outwardly directed force C due to cushion pressure acting on the skirt is taken to be constant. This force is of course reacted by tension in the side portions 4 of the wall members of the skirt and the ties 5 back to the anchorages 8 of the ties. The magnitude of the tension T in the ties 5 and the tension L in the adjusting ties 6 depends of course on the angular setting of the two parts of ties 5. With the tie 6 connected to the midpoint of the ties 5, and the connections 7 of the ties 5 to the side portions 4 held against longitudinal movement by the previously described restraining ties 9 or their equivalent, between the two positions of the system shown in FIGS. 10a and 10b the relative magnitudes of the tensions T and L will vary as indicated by vector diagrams 11a and 11b respectively. Since however, in accordance with the invention the lever system incorporating the lever B is mechanically equivalent to the lever system effectively constituted by the ties 5 and 6, and the arrangement is such that as the mechanical advantage of one lever system alters an equal and opposite alteration occurs in the other lever system, the force S required to be transmitted by the control cables 12 to the lever B to operate the tie 6 remains constant as also demonstrated by the vector diagrams.

To achieve this end, in the simple idealised system of diagrams 10 the lever B has an operative length equal to half the operative length of the ties 5. Furthermore it is arranged that the angle Y between the adjusting tie 6 and the lever B is substantially half the angle X included between the two parts of each tie 5. It is also arranged that the angle Y and the angle Z formed between the control cable 12 and the lever, amount in sum to 90°.

Once it is arranged that the force in a control cable 12 required to effect movement of its associated adjusting tie is maintained substantially constant, at least over the range of movement envisaged, it will be seen that it can be arranged that the forces exerted on the control column by the control cables of each skirt section of an interconnected pair of skirt sections are balanced one by another, with the result that in principle the only force required on the control column to operate the skirt adjusting mechanism will be that needed to overcome friction in the system. This of course presupposes that upon movement of the skirt sections there is substantially no alteration in the volume of the cushion they contain i.e. fluctuations of cushion pressure do not occur consequent upon the skirt movements.

Preferably all the skirt sections are of the same form and of equal length so that the arrangement of all the ties and cranks or levers may be the same. If necessary, however, interconnected skirt sections may be of different lengths or forms provided the mechanical advantages of the cranks or levers employed are suitably arranged to cater for the difference in the total forces exerted on one skirt section as opposed to the other by cushion pressure.

In embellishment of the above general description of the skirt control mechanism of this invention and first with reference to FIGS. 1–3 it will be appreciated that it is the lower arm of each lever 13 which is equivalent to the lever B of FIG. 10, the operative length of the lower arms of the levers 13 being equal to half the operative length of the ties 5, to the mid-point of which their associated adjusting tie 6 are connected.

In the arrangement of FIGS. 4a and 4b it is each lever 23 which is equivalent to the lever B, the bellcranks 13 the lower arms of which in the special case illustrated are shortened compared with those of FIGS. 1 to 3, being arranged through the position of the connections of the cables 25 to the levers 23, to have the same mechanical advantage as the bellcranks of FIGS. 1 to 3.

In FIG. 5 it is again the lower arm of the two-armed lever which is the equivalent of lever B, and in FIG. 6 it is the outer arm of the bellcrank. In both these cases in which the relevant lever arms are disposed and act in the same plane as the ties 5 they of course extend parallel to the inner portions of the ties 5 as does the lever B of the idealised diagrams of FIG. 10. The preceding embodiments however, and that of FIG. 7 where the lever 31 is equivalent to lever B, indicate that the spatial disposition of the lever B or equivalents thereof is a matter of choice.

All that is necessary, as mentioned above and as indicated in FIG. 6c, is that the included angle X between the two parts of the ties 5 is twice the angle Y formed between the adjusting ties 6 and the first arm of the bellcrank lever 13, and the angle Y plus the angle Z formed between the control cable 12 and the second arm of the bellcrank in sum amount to 90°. When as in the case illustrated a right-angled bellcrank is employed then the adjusting ties 6 and cables 12 will extend parallel to each other.

In practice it will be understood there will be a limit to the degree to which the ties 5 can be "cranked" and also over their range of movement there will be deviations from the desired substantially constant angular relationship between the ties 6 and cables 12. Thus for example, particularly at the extremes of their movement the adjusting ties 6 and control cables 12 associated with a right-angled bellcrank will tend to diverge from their desired parallel relationship. At least over a middle operating range however this deviation will be insufficient to cause any great change in the substantially constant force to be applied to and by the cables 12.

Figure 6C:
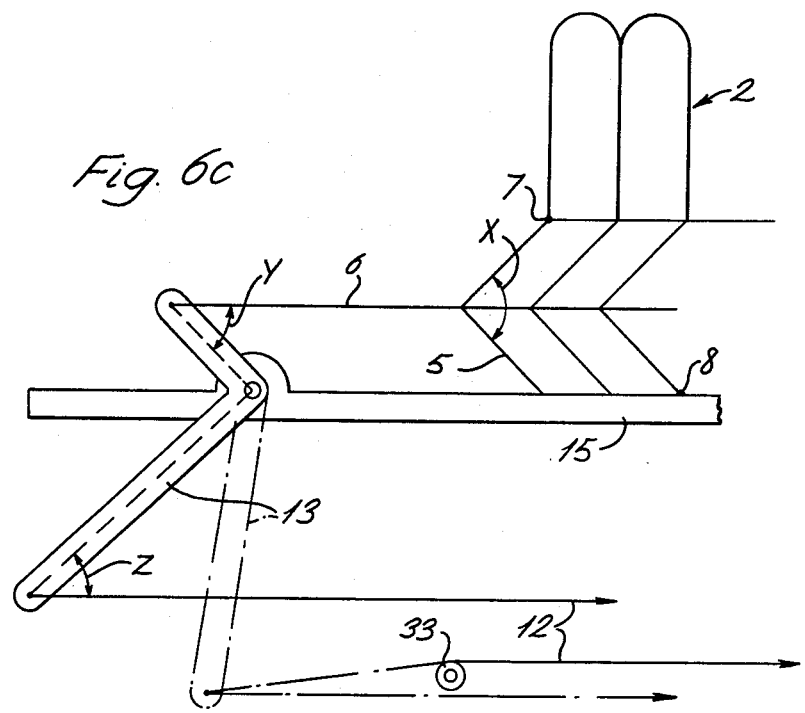
FIG. 6c is a fragmentary plan view on an enlarged scale of a modification to the mechanism of FIGS. 6a and 6b.

Although it has been assumed in the foregoing that the total forces exerted on a skirt section, and to be restrained inter alia by the control system, will remain substantially constant, cases can occur in which this is not so. Thus for example if the vehicle is rolled such that the lower edges of the wall members of one skirt section partly collapse into contact with the surface, then of course the area of that partly collapsed skirt section on which the cushion pressure acts will be less than the area of the uncollapsed skirt section on the opposite side of the craft to which the first mentioned section is interconnected. Thus the desired balance in the control system will be upset. In order at least to alleviate if not avoid this imbalance, as indicated in FIG. 6c an additional pulley or roller 33 may be provided which will be contacted by the cable 12 when the latter is operated to pull its associated skirt section inwards beyond a predetermined amount. The result is that the angle Z formed between the cable 12 and the second arm of the bellcrank 13 will be varied and it can be arranged that the change in the angle Z is such that a balance of loads is maintained at the control stick 10. Conversely rollers 33 or their equivalent may be arranged to correct deviation of the control cables towards extremes of their travel tending to vary the angle Z.

As will be noted most clearly from FIGS. 1 and 6b the interconnection of the skirt sections via the control column 10 is such that operation of the column is in accordance with normal senses. Thus assuming the vehicle is facing in the direction of the arrow A, backward movement of the column 10 will cause inward movement of the two aft skirt sections and outward movement of the two fore sections with the result that the centre of pressure of the cushion will be moved forwardly and the craft will adopt a nose up attitude. Similarly movement of the control column to one side will cause the skirt sections on that side to be drawn inwardly and those on the other side to move outwardly with the result that the vehicle will roll in the direction to the side to which the column is moved. With the universal mounting of the control column any combination of rolling and pitching movements of the vehicle may be effected.

The turnbuckles 19 apart from being of use in adjusting the effective lengths of the control cables to take up stretch and to set them to have the ties 5 orientated in the required datum position, may also be employed to adjust the trim of the vehicle. Provision may also be made by for example arranging for vertical adjustment of the control column to cause all the skirt sections to be paid out or drawn in and thus adjust the effective area of the cushion and hence the cushion pressure.

Springs (not shown) may be inserted in the control cables 12 in order to introduce a degree of springing into the cushion suspension system.

Apart from selecting the lengths of the lever arms of the bellcranks or other levers when necessary to equalise the forces exerted by the control cables on the control column, these levers may also be selected to minimise the forces which act at the control column. Although it is not essential, in the embodiments of FIGS. 1 to 6 in which the bellcranks are mounted on a separate frame or chassis of the vehicle there is the advantage that this frame or chassis rather than the other structure of the vehicle takes the majority of the loads imposed on the skirt controlling mechanism by cushion pressure.

The arrangement of the control system also has the advantage that in the event of one control cable breaking both the skirt section controlled by that cable and its intended interconnected pair will be paid out, there being in the case of neither section anything to resist outward movement of the skirt sections under the influence of cushion pressure until they are held by straightening of the ties 5. The arrangement is thus such that it fails safe. Depending upon the degree of movement provided for in the system, to prevent over extension of the skirts in the event of failure of the control mechanism it may be desirable to affix additional ties (not shown) which act in parallel with the ties 5 to limit the extent to which the skirt can move outwardly. The limiting position of the skirt is one beyond which the cushion pressure will exert a net upward force on the skirt. With skirts as illustrated this point will be reached at approximately the condition when the seal point of the wall members with the subjacent surface comes to lie outboard of the line of attachment of the loop 1 to the vehicle body.

It will be understood that the invention has been described in relation to its most simple forms employing systems directly operable by a control stick. Many mechanical equivalents for a variety of the components may manifestly be provided, particularly if the system is applied to large craft. Plainly, for example, the control cables 12 may be replaced by servo-mechanisms operable in any appropriate manner from a central control point.

Finally although the invention has only been described in relation to gas cushion vehicles the control system could equally be applied to similar skirt arrangements employed for containing cushions of pressurised liquid.

We claim:

1. In a gas cushion vehicle having a skirt comprising upper and lower parts of flexible sheet material, the upper part being connected to the vehicle body so as to be deflectable relative thereto, at least the lower part comprising a contiguous succession of independently deflectable flexible wall members each having an outer portion which faces the gas cushion and a pair of inwardly extending side portions, the side portions being connected to the vehicle body by tie means, the provision of a skirt control mechanism comprising adjusting tie means extending substantially at right angles to the said tie means and operatively connected to substantially the midpoint thereof, means including a lever system operative to effect linear movement of the adjusting tie means and means to at least restrict movement of the wall members in a direction parallel to the adjusting tie means upon adjusting movement thereof, whereby upon linear movement of the adjusting tie means the said tie means connected to the side portions of the wall members are caused to be angled and thereby result in the outer portions of the wall members being moved in a direction towards or away from the vehicle body, the lever system being mechanically equivalent to the lever system effectively constituted by the said tie means and the said adjusting tie means and arranged to act such that as the mechanical advantage of one lever system alters an equal and opposite alteration occurs in the other lever system so that for a given cushion pressure the force required to operate the adjusting tie means is maintained substantially constant at least over a predetermined range of movement.

2. A gas cushion vehicle as claimed in claim 1 in which the skirt is formed in at least two sections each provided with a control mechanism, the control mechanisms being operatively interconnected so that the forces exerted on each are balanced the one by the other.

3. A gas cushion vehicle as claimed in claim 2 in which the skirt is divided into two fore and two aft skirt sections and the fore skirt sections are operatively interconnected to the aft skirt sections on opposite sides of the craft.

4. A gas cushion vehicle as claimed in claim 1 in which the lever system comprises a lever the operative length of which is equal to half the operative length of the tie means of the side portions of the wall members and the angle formed between the lever and the adjusting tie is arranged to equal half the angle included between the parts of the ties of the side portions on either side of their connection to the adjusting tie and the lever is in turn operated by means acting at an angle which in sum with the first mentioned angle amounts to 90°.

5. A gas cushion vehicle as claimed in claim 4 in which the lever comprises one arm of a right-angled bellcrank lever.

6. A gas cushion vehicle as claimed in claim 1 in which the means for restricting movement of the wall members parallel to the adjusting tie means comprise a duplicate set of tie means connecting the side portions of the wall members to the vehicle body which duplicate tie means are connected to a duplicate adjusting tie means arranged to operate simultaneously with but in the opposite direction to the first mentioned adjusting tie means so that in operation each duplicated pair of tie means connected to the side portions of the wall members adopts a symmetrical diamond formation.

7. A skirt for a gas cushion vehicle comprising upper and lower parts of flexible sheet material, the upper part being connected to the vehicle body so as to be deflectable relative thereto, at least the lower part comprising a contiguous succession of wall members each having an outer portion which faces the gas cushion and a pair of inwardly extending side portions, tie means connecting the side portions to the vehicle body and adjusting means for causing the tie means to swing in a substantially horizontal plane about their attachments to the vehicle and thereby result in the outer portions of the wall members being moved laterally relative to the vehicle body, the adjusting means comprising further tie means extending substantially at right angles to and connected substantially to the midpoint of the ties of the side portions, means including a lever system operative to effect linear movement of the further tie means to cause the said movement of the skirt and means for restricting movement of the wall members in a direction parallel to that of the further tie means upon adjusting movements thereof, in which the said lever system includes a lever having at least one arm the length of which is equivalent to half the operative length of the tie means of the side portions, the angle formed between the said arm of the lever and the said further tie means being arranged to equal half the angle included between the parts of the ties of the side portions on either side of their connection to the said further tie means and control cables for operating the lever are maintained in a predetermined angular relationship with the adjusting tie means whereby the mechanical advantage obtained via the lever alters in an equal and opposite sense to alterations in the mechanical advantage of the system comprising the said further tie means and the tie means of the side portions upon movement thereof, so that for a given cushion pressure the force required to be applied to the lever to effect the said skirt movement is maintained substantially constant.

8. Means for horizontally adjusting the boundary of a cushion of a gas cushion vehicle in a direction towards or away from the same comprising a skirt having upper and lower parts of flexible sheet material for containing the cushion at least in part, the upper part being connected to the vehicle body so as to be deflectable relative thereto and at least the lower part comprising a contiguous succession of wall members each having an outer portion which faces the gas cushion and a pair of inwardly extending side portions connected by tie means to the vehicle body, adjusting tie means extending substantially at right angles to and connected to the midpoint of the tie means of the side portions, means including a lever system operative to effect linear movement of the adjusting tie means and means to at least restrict movement of the wall members in a direction parallel to the adjusting tie means upon adjusting movement thereof, whereby upon linear movement of the adjusting tie means the tie means connected to the side portions are caused to be angled and thereby result in the outer portions of the wall members being moved substantially horizontally in a direction towards or away from the vehicle body, the lever system including at least one arm of a length equivalent to half the operative length of the side portions of the wall members and so arranged as operatively to constitute with the said tie means a parallelogram linkage system whereby the force required to operate the said lever is maintained substantially constant for a given cushion pressure.

* * * * *